(12) United States Patent
Gray

(10) Patent No.: US 10,723,273 B1
(45) Date of Patent: Jul. 28, 2020

(54) ROOF ACCESS DEVICE FOR A VEHICLE

(71) Applicant: Toyota Motor Engineering & Manufacturing North America, Inc., Plano, TX (US)

(72) Inventor: John Gray, Saline, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/258,390

(22) Filed: Jan. 25, 2019

(51) Int. Cl.
 *B60R 3/00* (2006.01)
 *B60R 3/02* (2006.01)

(52) U.S. Cl.
 CPC ............... *B60R 3/02* (2013.01); *B60R 3/005* (2013.01)

(58) Field of Classification Search
 CPC .......... B60R 3/02; B60R 3/005; B60R 3/007; B62D 25/04
 See application file for complete search history.

(56) References Cited

U.S. PATENT DOCUMENTS

| | | | |
|---|---|---|---|
| 4,626,016 A * | 12/1986 | Bergsten | B60N 3/02 105/354 |
| 5,342,073 A | 8/1994 | Poole | |
| 5,897,125 A | 4/1999 | Bundy | |
| 6,065,798 A | 5/2000 | Sankrithi | |
| 6,269,906 B1 * | 8/2001 | Dockter | B60R 3/007 182/92 |
| 6,460,915 B1 | 10/2002 | Bedi et al. | |
| 6,471,002 B1 * | 10/2002 | Weinerman | B60R 3/02 182/90 |
| 6,574,833 B1 * | 6/2003 | Tomaiuolo | B60N 3/026 16/110.1 |
| 7,025,365 B2 | 4/2006 | Bang et al. | |
| 7,219,911 B2 | 5/2007 | Sukonthapanich et al. | |
| 7,607,674 B2 | 10/2009 | Watson | |
| 8,215,453 B2 | 7/2012 | Mickens | |
| 8,905,354 B2 * | 12/2014 | Griffiths | B64C 1/24 182/89 |
| 8,991,889 B1 | 3/2015 | Levi et al. | |
| 9,302,719 B1 | 4/2016 | Krishnan et al. | |
| 9,403,466 B1 * | 8/2016 | Deng | B60N 3/023 |
| 9,475,432 B1 * | 10/2016 | Rauschert | B60R 11/00 |
| 9,522,634 B1 | 12/2016 | Smith | |
| 10,106,086 B1 * | 10/2018 | Eckstein | B60R 3/005 |
| 10,155,479 B2 * | 12/2018 | Lewis | B60R 3/007 |

(Continued)

FOREIGN PATENT DOCUMENTS

GB          2477429 A          8/2011

*Primary Examiner* — Brian L Swenson
(74) *Attorney, Agent, or Firm* — Snell & Wilmer LLP

(57) ABSTRACT

An apparatus for enabling a user to access a roof of the vehicle. The apparatus may be positioned within a cavity that is located on a front surface of a B-pillar or a C-pillar of a vehicle. The apparatus including a plate having a distal end and a proximal end, the plate movable between a stored position where the plate is positioned within the cavity and the plate is configured to be substantially flush with the front surface of the B-pillar or the C-pillar, and an extended position where a majority of the plate is positioned outside the cavity and the plate is configured to be substantially perpendicular to the front surface of the B-pillar or the C-pillar to allow the user to place his or her foot on the plate for accessing the roof of the vehicle.

20 Claims, 6 Drawing Sheets

(56) References Cited

U.S. PATENT DOCUMENTS

| | | | |
|---|---|---|---|
| 2003/0127285 A1* | 7/2003 | Claeys | B60R 3/005 182/127 |
| 2008/0116008 A1 | 5/2008 | Wass et al. | |
| 2017/0144602 A1 | 5/2017 | Kelly et al. | |
| 2019/0275952 A1* | 9/2019 | Bennett | B60R 3/005 |

* cited by examiner

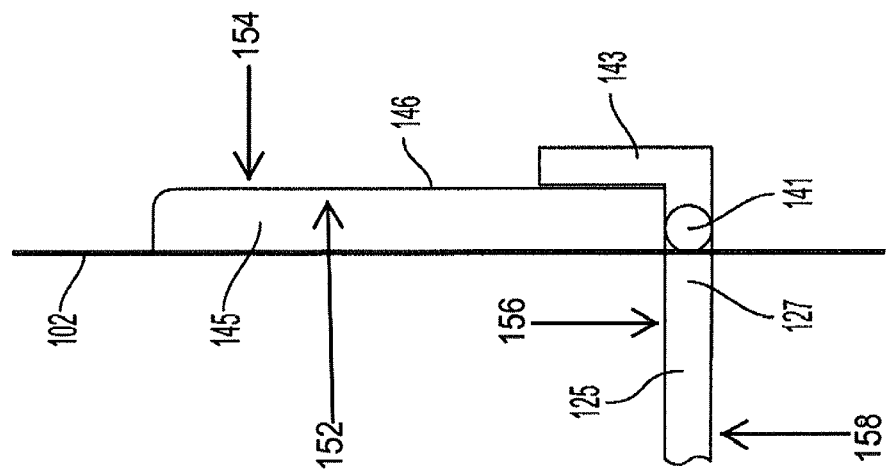
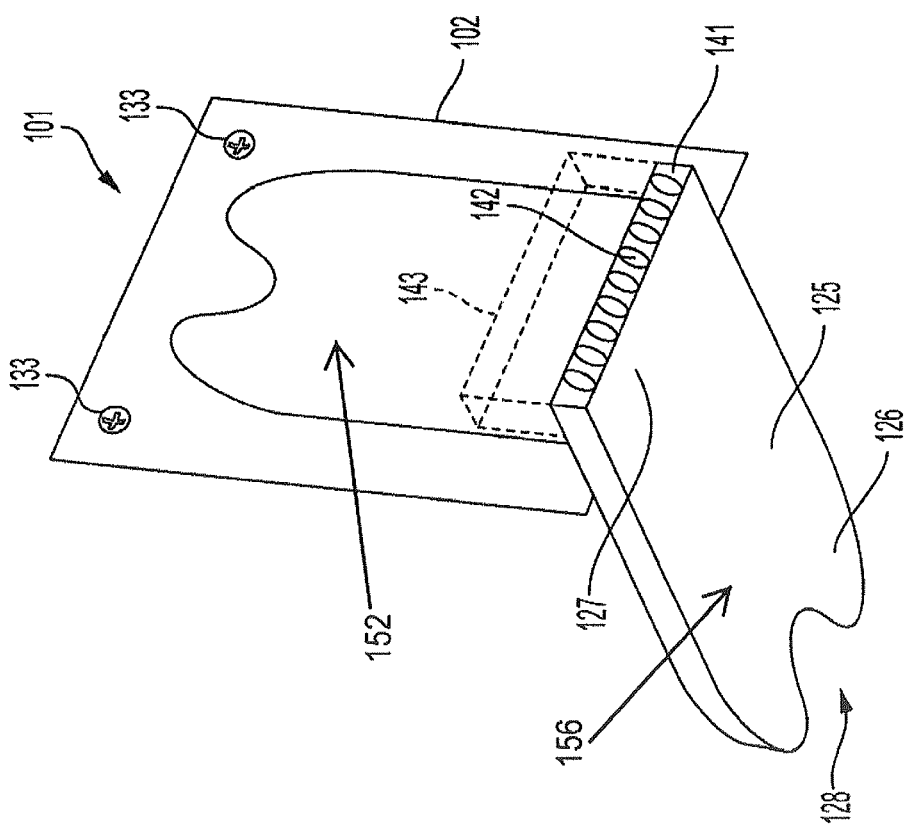
FIG. 5B
FIG. 5A

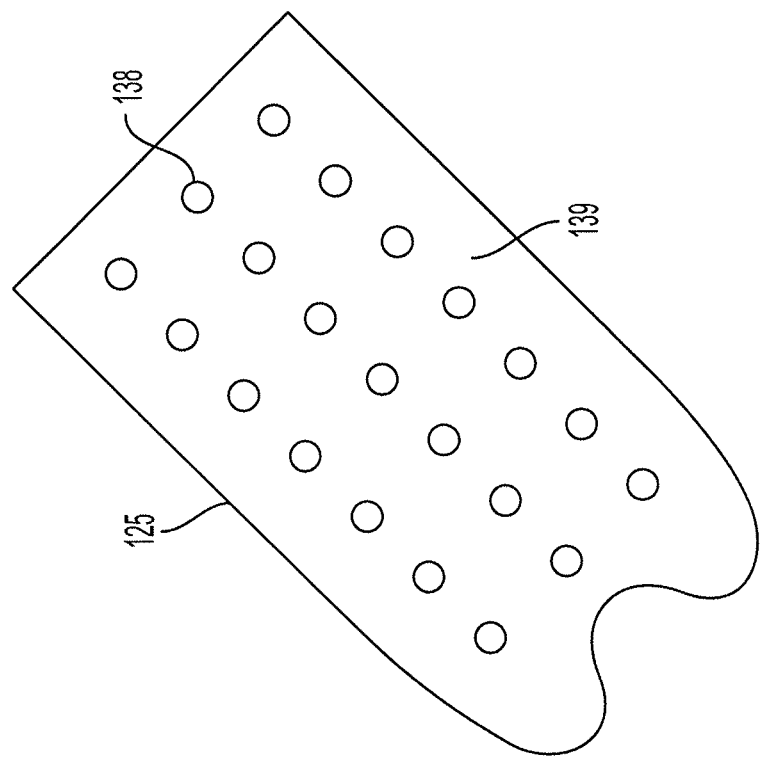
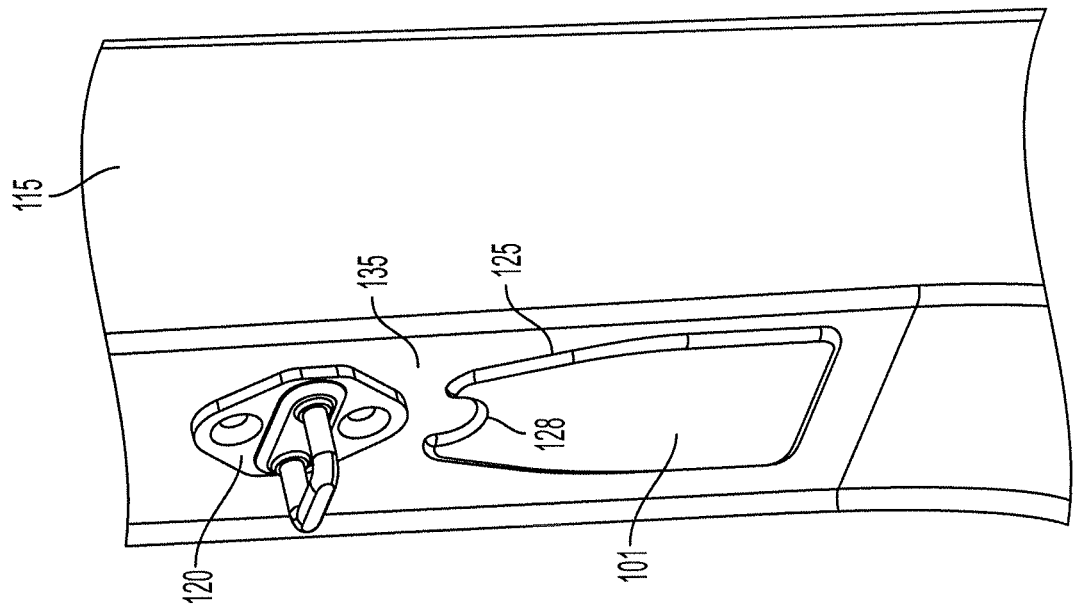

ROOF ACCESS DEVICE FOR A VEHICLE

BACKGROUND

1. Field

The present disclosure is directed to a roof access device for a vehicle.

2. Description of the Related Art

Users (e.g., drivers and/or passengers) of vehicles may need to access the roof of their vehicle for various reasons, such as, cleaning or washing the roof of the vehicle, attaching a roof rack to the roof of the vehicle, securing or removing bicycles, skis or luggage to and from the roof rack or the roof of the vehicle, etc. The roof (or the top) of a vehicle is often difficult to reach due to its distance from the ground. Also, shorter users may have difficulty reaching the roof (or the top) of the vehicle.

Sometimes, users use a ladder to access the roof of a vehicle. In order to access the roof of the vehicle, the ladder will need to be positioned in close proximity to the vehicle; however, the ladder will also need to be held by another person in order to make sure it doesn't tip over. This may not be possible since users are sometimes alone and unable to find someone to hold the ladder in place. Furthermore, ladders may not be easily accessible, especially when the user is not at home where a ladder is generally stored. Quite often, the user is not at home and thus accessing the roof of the vehicle or other items on the roof is difficult and cumbersome.

Therefore, there is a need for a roof access device for a vehicle.

SUMMARY

An apparatus for enabling a user to access a roof of the vehicle. The apparatus may be positioned within a cavity that is located on a front surface of a B-pillar or a C-pillar of a vehicle. The apparatus including a housing having a rear portion and defining a cavity and a rod positioned within the cavity and extending along a width of the cavity. The apparatus further including a plate having a distal end and a proximal end attached to the rod, the plate movable between a stored position where the plate is positioned within the cavity and the plate is configured to be substantially flush with the front surface of the B-pillar or the C-pillar, and an extended position where a majority of the plate is positioned outside the cavity and the plate is configured to be substantially perpendicular to the front surface of the B-pillar or the C-pillar to allow the user to place his or her foot on the plate for accessing the roof of the vehicle.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 5A is a perspective front view of the apparatus according to an aspect of the present disclosure;

FIG. 5B is a right side view of the apparatus showing a rear plate against an outer surface of the housing according to an aspect of the present disclosure;

FIG. 6 is an exploded perspective view of the apparatus in the stored or closed position and the door latch fastened or secured to the front surface of the B-pillar according to an aspect of the present disclosure; and FIG. 7 is a front view of an optional rubber pad or surface that attaches to or is molded onto the top surface of the plate to allow the user's foot to have a better grip according to an aspect of the present disclosure.

DETAILED DESCRIPTION

The apparatus and systems described herein enable users (e.g., drivers, passengers, friends, neighbors, etc.) to have convenient, easy and safe access to the roof of a vehicle. Users of vehicles may need to access the roof of a vehicle for various reasons, such as, cleaning or washing the roof of the vehicle, attaching a roof rack to the roof of the vehicle, securing or removing bicycles, skis or luggage to and from the roof rack or the roof of the vehicle, etc. The apparatus and/or systems described herein advantageously provides a built-in, retractable, and compact step or plate that is secured or fastened to a pillar or a frame of the vehicle. The step or plate is movable or rotatable between a stored or closed position and an extended or open position. In the stored or closed position, the step or plate is positioned flush with a B-pillar of a vehicle frame and allows the vehicle door to open and close. In the extended or open position, the step or plate allows the user's foot to be placed thereon and allows the user to better and more conveniently access to the roof of the vehicle. The vehicle door needs to be opened in order to access and allow use of the step or plate. When the vehicle door is open, the user can pull the step or plate in a downward direction so that the user can place his/her foot thereon to access the roof of the vehicle. Upon release or removal of the hand or the foot from the step or plate, the step or plate automatically retracts back into the stored or closed position so that it is flush with the B-pillar of the vehicle frame. Once the step or plate is back in the stored or closed position, the vehicle door can then be closed.

Figure 1:
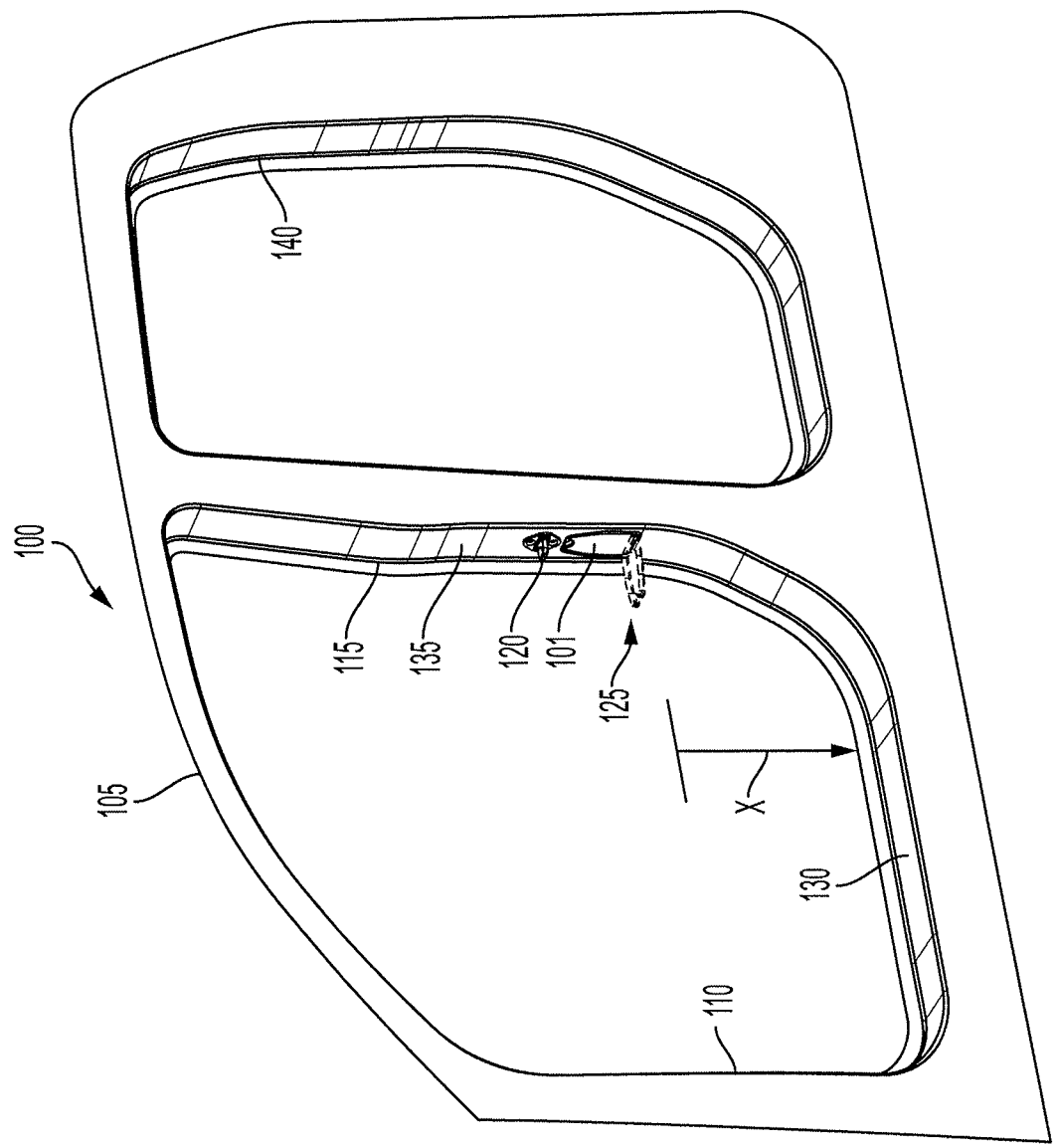
FIG. 1 is a perspective view of a driver's side frame of a vehicle and an apparatus for accessing the roof of the vehicle according to an aspect of the present disclosure.

FIG. 1 is a perspective view of a driver's side frame 100 of a vehicle and an apparatus 101 for accessing the roof of the vehicle according to an aspect of the present disclosure. The driver's side frame 100 is shown with the other vehicle components (e.g., seats, doors, roof, etc.) missing to better illustrate the features of the present disclosure. The frame 100 includes an A-pillar 110, a B-pillar 115, a C-pillar 140, and a floor step 130. The frame 100 is a strong, structural aluminum or metallic body part of the vehicle that is used to provide strength, integrity and safety for the vehicle and its passengers. The doors (not shown) of the vehicle are hinged or rotatably attached to the frame 100 (e.g., the A-pillar 110 and the B-pillar 115) of the vehicle. That is, the front doors are attached to the A-pillar 110 and/or the B-pillar 115 and the rear doors are attached to the B-pillar 115 and/or the C-pillar 140.

Figure 4:
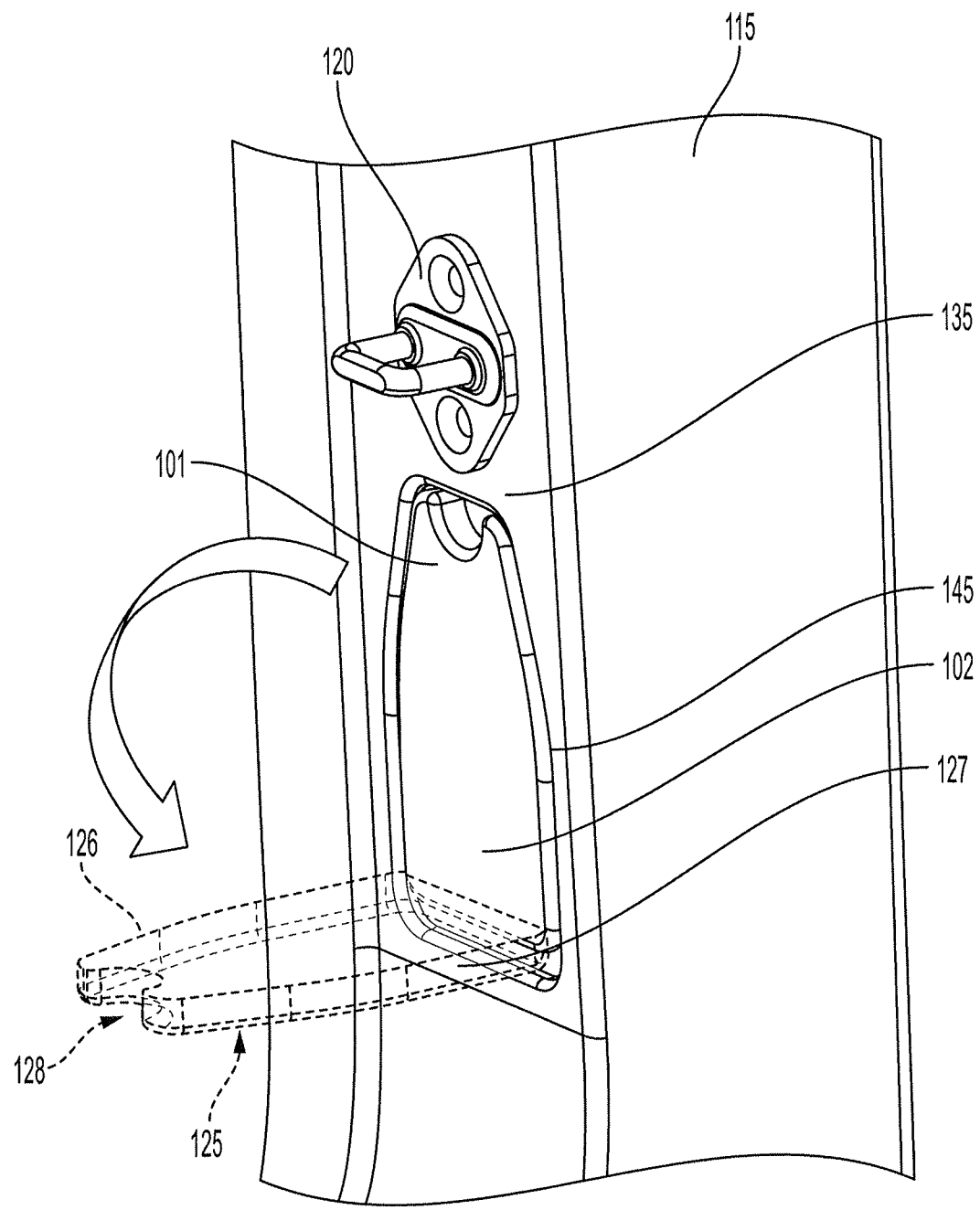
FIG. 4 is an exploded perspective view of the apparatus in the extended or open position and the door latch fastened or secured to the front surface of the B-pillar according to an aspect of the present disclosure.

When the driver's door is closed, a handle mechanism in the door attaches to or is secured to a door latch 120. The door latch 120 is secured, via bolts or screws, to the B-pillar 115 or to the C-pillar 140. The door latch 120 may be a C-shaped door latch. As shown in FIGS. 1 and 4, the door latch 120 may be attached to or secured to a front surface 135 of the B-pillar 115 or the C-pillar 140.

Figure 2:
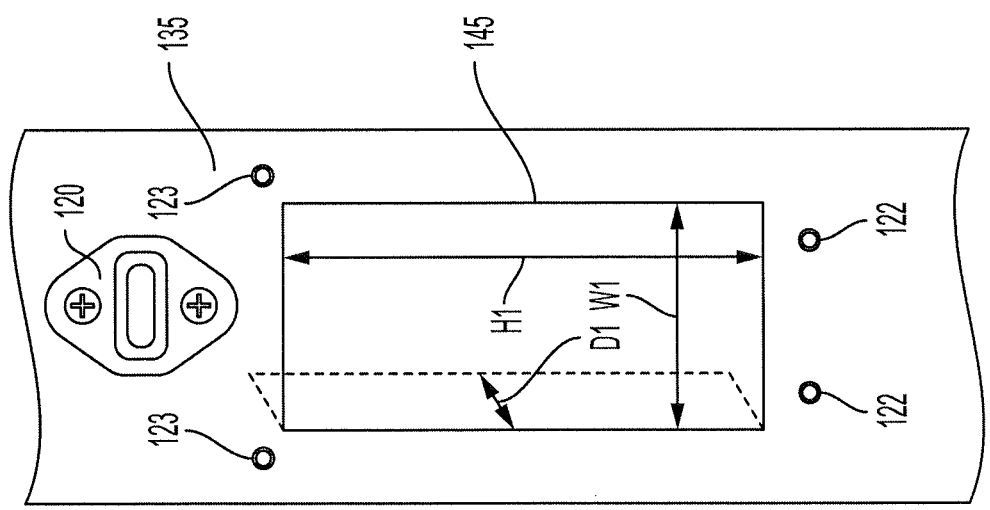
FIG. 2 is an exploded front view of the B-pillar with a cavity or an opening in the front surface of the B-pillar according to an aspect of the present disclosure.

FIG. 2 is an exploded front view of the B-pillar 115 with a cavity or an opening 145 in the front surface 135 of the B-pillar 115 according to an aspect of the present disclosure. The cavity 145 is shaped, sized and configured to fit an apparatus 101 that is used to enable a user to access a roof of a vehicle. The cavity 145 may be formed during the manufacturing process of the frame or by cutting out or removing a small portion of the frame or the B-pillar 115. In one embodiment, the cavity 145 has a height H1 of between 130 millimeters (mm) and 150 mm, a width W1 of between 60 mm and 75 mm, and a depth D1 of between 10 mm and 25 mm. The cavity 145 may be positioned to be at a distance X above or from the floor step 130, where X is between 300 mm and 500 mm (see also FIG. 1). The cavity 145 can be positioned above or below the door latch 120. In one embodiment, two cavities 145 can be provided, one above (e.g., X=420 mm) and one below (e.g., X=330 mm) the door latch 120, on the front surface 135 of the B-pillar 115. The apparatus 101 can be placed in each cavity 145. This allows the user to have two steps, one for each foot, at different heights or to allow for different height users to choose which step to utilize for access to the roof of the vehicle. The apparatus 101 and the cavity 145 can also be located on the C-pillar 140. The front surface 135 of the B-pillar 135 may also include four holes, two upper holes 123 and two lower holes 122, for securely fastening the apparatus 101, via two upper screws 133 and two lower screws 132, to the B-pillar 115 or the C-pillar 140 (see also FIG. 3).

Figure 3:
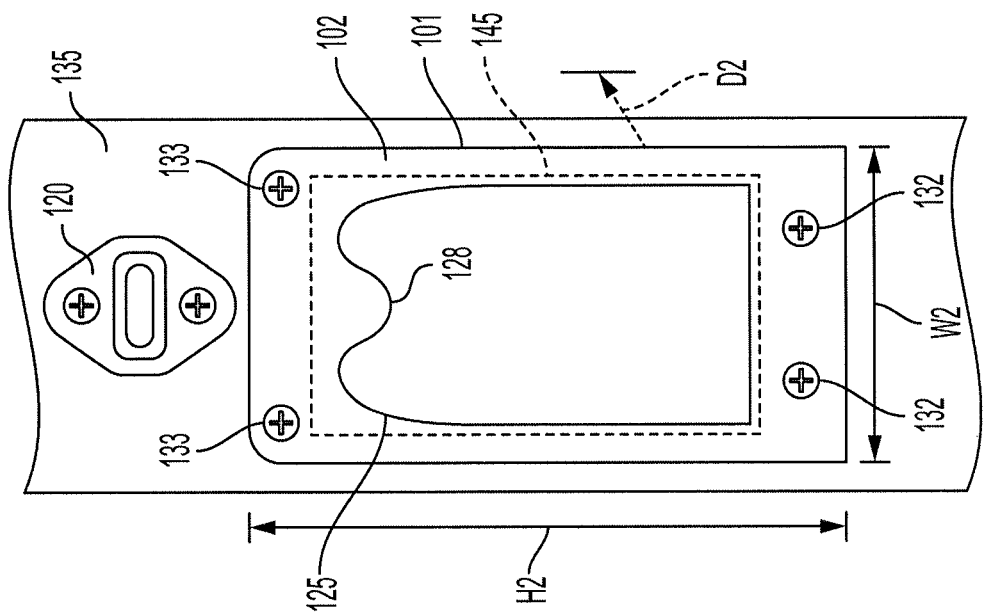
FIG. 3 is an exploded front view of the apparatus positioned within the cavity of FIG. 2 according to an aspect of the present disclosure.

FIG. 3 is an exploded front view of the apparatus 101 positioned within the cavity 145 of FIG. 2 according to an aspect of the present disclosure. The apparatus 101 includes a plate 125 that pivots between a stored or closed position (shown in FIGS. 3 and 6) and an extended or open position (shown in FIGS. 1, 4 and 5A). The plate 125 can also be referred to as a step and can have a rubber pad or surface 127 thereon (see also FIG. 7) to allow the user's foot to have a better grip. The apparatus 101 also includes a housing 102 that surrounds the plate 125 and allows the apparatus 101 to be connected or securely fastened to the front surface 135 of the B-pillar 115.

In one embodiment, the apparatus 101 has a height H2 of between 140 mm and 160 mm, a width W2 of between 65 mm and 85 mm, and a depth D2 of between 10 mm and 25 mm. The apparatus 101 may be positioned to be at a distance X from the floor step 130, where X is between 300 mm and 500 mm. The apparatus 101 is advantageously placed a distance X above the floor step 130 so that it is easy, safe and convenient for the user to place his/her foot on the plate 125 to access the roof of the vehicle.

FIG. 4 is an exploded perspective view of the apparatus 101 and the door latch 120 fastened or secured to the front surface 135 of the B-pillar 115 according to an aspect of the present disclosure. The plate 125 is shown in the extended or open position. In the extended or open position, the plate 125 is positioned along a horizontal plane and is substantially perpendicular to the front surface 135 of the B-pillar 115 to allow the user to place his or her foot on the plate 125 to access the roof of the vehicle. Hence, the plate 125 and the apparatus 101 is strong enough to support the entire weight of the user. In one embodiment, the plate 125 is positioned substantially parallel to a plane defined by the floor step 130.

The plate 125 has a distal end 126 and a proximal end 127 moveably attached or coupled to the housing 102. The distal end 126 of the plate 125 has a curved cut out 128 sized and shaped to fit a finger for allowing the user's finger to fit therein to open and/or close the plate 125. That is, the plate 125 is movable or rotatable between a stored or closed position (FIG. 6) where the plate is positioned within the cavity and the plate 125 is substantially flush with the front surface 135 of the B-pillar 115 and an extended or open position (FIG. 4) where a majority (i.e., more than 50%) of the plate 125 is positioned outside the cavity 145 and the plate 125 is substantially perpendicular with the front surface 135 of the B-pillar 115.

Figure 5C:
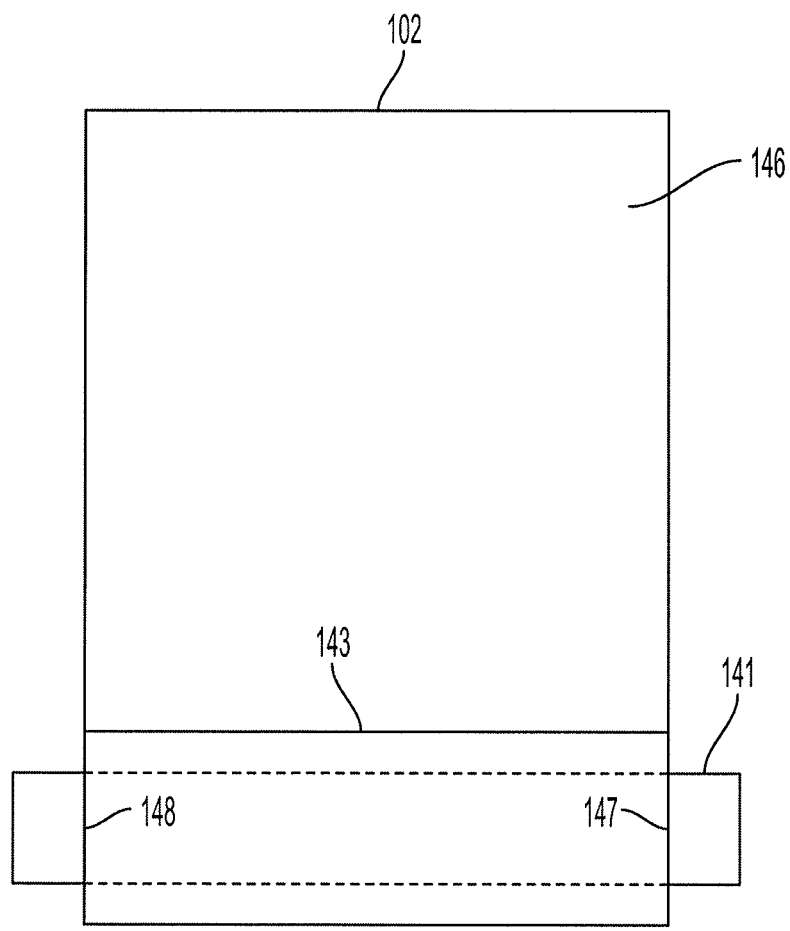
FIG. 5C is a rear view of the housing showing the ends of the rod and the rear plate according to an aspect of the present disclosure.

FIG. 5A is a perspective front view of the apparatus 101, FIG. 5B is a right side view of the apparatus 101 showing a rear plate 143 against a rear surface 154 of the rear portion 146 of the housing 102, and FIG. 5C is a rear view of the housing 102 showing the ends of the rod 141 and the rear plate 143 according to an aspect of the present disclosure. Referring to FIGS. 5A-5C, the apparatus 101 may also include a rod 141, a spring 142, and a rear plate 143. In one embodiment, the proximal end 127 of the plate 125 is attached to the rod 141 and the rod 141 is moveably attached to the housing 102. That is, the rod 141 is positioned through a left hole 147 and a right hole 148 in the housing 102 such that the rod 141 can rotate about a horizontal axis and the plate 125 can also rotate up and down. The rod 141 is positioned within the cavity 145 and extends along the width of the cavity 145 and through the left and right holes 147, 148 in the housing 102. In one embodiment, the plate 125, the rod 141, and/or the rear plate 143 are integrated as a single part. The plate 125 may have a stepping surface 156 for the user to place the user's foot onto, in order to access the roof of the vehicle. The stepping surface 156 is located on an opposite side of a flush surface 158 on the plate 125. The flush surface 158 is substantially flush with the front surface of the B-pillar 115 or C-pillar 140 when the plate 125 is in the stored position. In addition, when the plate 125 is in the stored position, the stepping surface 156 contacts a front surface 152 of the rear portion 146 of the housing 102. The front surface 152 is opposite the rear surface 154 of the rear portion 146 of the housing 102. The front surface 152 is located within the cavity 145.

The housing 102, the plate 125, the rod 141, and the rear plate 143 may be made of a strong, durable metallic material such as aluminum or steel and may be magnetized so that when the rear plate 143 contacts the housing 102, a magnetic force between the rear plate 143 and the housing 102 holds or locks the two together such that the plate 125 is maintained in the extended or open position without the user having to hold the plate 125 in the extended or open position. The rear plate 143 can also be connected to the rod 141 such that the rear plate 143 and the plate 125 are substantially perpendicular to one another. Therefore, when the plate 125 is in the extended or open position, the rear plate 143 contacts and presses against the rear surface 154 of the rear portion 146 of the housing 102 to hold the plate 125 in a substantially horizontal position. Also, the rear portion 146 of the housing 102 is strong enough to not deform, thus allowing the plate 125, in its extended or open position, to support the entire weight of the user.

In one embodiment, the spring 142 may be coupled to or wrapped around the rod 141 in a manner to be spring loaded so that the plate 125 closes when the plate 125 is not held open. That is, the spring 142 tends to pull the plate 125 to its stored or closed position. This also provides the safety feature that the vehicle door does not accidentally close on the plate 125 when the plate 125 is in the extended or open position. Therefore, in order for the plate 125 to remain in its extended or open position, the plate 125 needs to be pulled open and held down by the user's hand and/or foot.

FIG. 6 is an exploded perspective view of the apparatus 101 in the stored or closed position and the door latch 120 fastened or secured to the front surface 135 of the B-pillar 115 according to an aspect of the present disclosure. The plate 125 is shown in the stored or closed position where the plate 125 is positioned within the cavity 145 and the plate 125 is substantially flush with the front surface 135 of the B-pillar 115.

FIG. 7 is a front view of an optional rubber pad or surface 139 that attaches to or is molded onto the top surface of the plate 125 to allow the user's foot to have a better grip according to an aspect of the present disclosure. The rubber pad or surface 139 may include small a plurality of protrusions or bumps 138 thereon to allow the user's foot to have an even better grip. The plate 125 and/or the rubber pad or surface 139 allows the user's foot to be placed thereon for the user access to the roof of the vehicle.

The foregoing description of the disclosed example embodiments is provided to enable any person of ordinary skill in the art to make or use the present invention. Various modifications to these examples will be readily apparent to those of ordinary skill in the art, and the principles disclosed herein may be applied to other examples without departing from the spirit or scope of the present invention. The described embodiments are to be considered in all respects only as illustrative and not restrictive and the scope of the invention is, therefore, indicated by the following claims rather than by the foregoing description. All changes which come within the meaning and range of equivalency of the claims are to be embraced within their scope.

What is claimed is:

1. An apparatus for enabling a user to access a roof of the vehicle, the apparatus is positioned within a cavity that is located on a front surface of a B-pillar or a C-pillar of a vehicle, the apparatus comprising:
    a housing having a rear portion and defining a cavity, the rear portion having a front surface and a rear surface, the front surface being located within the cavity;
    a rod positioned within the cavity and extending along a width of the cavity; and
    a plate having a distal end, a proximal end attached to the rod, and a stepping surface, the plate movable between
        a stored position where the plate is positioned within the cavity and the plate is configured to be substantially flush with the front surface of the B-pillar or the C-pillar, the stepping surface of the plate contacting the front surface of the rear portion of the housing, and
        an extended position where a majority of the plate is positioned outside the cavity and the plate is configured to be substantially perpendicular to the front surface of the B-pillar or the C-pillar to allow the user to place his or her foot on the stepping surface of the plate for accessing the roof of the vehicle.

2. The apparatus of claim 1 further comprising a spring coupled to the rod in a manner to be spring loaded so that the plate automatically moves to the stored position when the plate is not being held open.

3. The apparatus of claim 1 further comprising a rear plate attached to the rod and being positioned substantially perpendicular to the plate.

4. The apparatus of claim 3 wherein the rear plate and the rear portion of the housing are magnetized so that when the rear plate contacts the rear surface of the rear portion of the housing, a magnetic force between the rear plate and the rear surface of the rear portion of the housing holds or locks the two together causing the plate to be maintained in the extended or open position without the user having to hold the plate in the extended or open position.

5. The apparatus of claim 3 wherein when the plate is in the extended or open position, the rear plate contacts and presses against the rear surface of the rear portion of the housing to hold the plate in a substantially horizontal position.

6. The apparatus of claim 1 further comprising a rubber pad positioned on the plate for allowing the user's foot to have a better grip.

7. The apparatus of claim 6 wherein the rubber pad has a plurality of protrusions for allowing the user's foot to have a better grip.

8. The apparatus of claim 1 wherein the plate has a distal end and a proximal end moveably attached to the housing.

9. The apparatus of claim 8 wherein the distal end has a curved cut out sized and shaped to fit a finger for allowing the user's finger to fit therein to open and close the plate.

10. The apparatus of claim 1 wherein the rod is positioned through a left hole and a right hole in the housing such that the rod can rotate about a horizontal axis and the plate can rotate up and down.

11. An apparatus for enabling a user to access a roof of the vehicle, the apparatus is positioned within a cavity that is located on a front surface of a frame of a vehicle, the apparatus comprising:
    a housing having a rear portion and defining a cavity, the rear portion having a front surface and a rear surface, the front surface being located within the cavity;
    a rod positioned within the cavity and extending along a width of the cavity; and
    a plate having a distal end, a proximal end attached to the rod, and a stepping surface, the plate movable between
        a stored position where the plate is positioned within the cavity and the plate is configured to be substantially flush with the front surface of the frame, the stepping surface of the plate contacting the front surface of the rear portion of the housing, and
        an extended position where a majority of the plate is positioned outside the cavity and the plate is configured to be substantially perpendicular to the front surface of the frame to allow the user to place his or her foot on the stepping surface of the plate for accessing the roof of the vehicle.

12. The apparatus of claim 11 further comprising a spring wrapped around the rod in a manner to be spring loaded so that the plate automatically moves to the stored position when the plate is not being held open.

13. The apparatus of claim 11 further comprising a rear plate attached to the rod and being positioned substantially perpendicular to the plate.

14. The apparatus of claim 13 wherein the rear plate and the rear portion of the housing are magnetized so that when the rear plate contacts the rear surface of the rear portion of the housing, a magnetic force between the rear plate and the rear surface of the rear portion of the housing holds or locks the two together causing the plate to be maintained in the extended or open position without the user having to hold the plate in the extended or open position.

15. The apparatus of claim 13 wherein when the plate is in the extended or open position, the rear plate contacts and presses against the rear surface of the rear portion of the housing to hold the plate in a substantially horizontal position.

16. The apparatus of claim 11 further comprising a rubber pad positioned on the plate for allowing the user's foot to have a better grip.

17. The apparatus of claim 16 wherein the rubber pad has a plurality of protrusions for allowing the user's foot to have a better grip.

18. The apparatus of claim 11 wherein the plate has a distal end and a proximal end moveably attached to the housing.

19. The apparatus of claim 18 wherein the distal end has a curved cut out sized and shaped to fit a finger for allowing the user's finger to fit therein to open and close the plate.

20. The apparatus of claim 11 wherein the rod is positioned through a left hole and a right hole in the housing such that the rod can rotate about a horizontal axis and the plate can rotate up and down.

* * * * *